United States Patent
Kim et al.

(10) Patent No.: US 12,132,200 B2
(45) Date of Patent: Oct. 29, 2024

(54) POSITIVE ELECTRODE FOR SECONDARY BATTERY, METHOD OF PREPARING THE SAME, AND LITHIUM SECONDARY BATTERY INCLUDING THE SAME

(71) Applicant: LG Energy Solution, Ltd., Seoul (KR)

(72) Inventors: Ju Ri Kim, Daejeon (KR); Seok Koo Kim, Daejeon (KR); Sun Kyu Kim, Daejeon (KR); Young Sik Kim, Ulsan (KR); Jooyong Song, Daejeon (KR); Hyun Woo Kim, Ulsan (KR); Young Jun Lim, Ulsan (KR)

(73) Assignee: LG Energy Solution, Ltd., Seoul (KR)

( * ) Notice: Subject to any disclaimer, the term of this patent is extended or adjusted under 35 U.S.C. 154(b) by 642 days.

(21) Appl. No.: 17/052,037

(22) PCT Filed: Sep. 6, 2019

(86) PCT No.: PCT/KR2019/011573
§ 371 (c)(1),
(2) Date: Oct. 30, 2020

(87) PCT Pub. No.: WO2020/050694
PCT Pub. Date: Mar. 12, 2020

(65) Prior Publication Data
US 2021/0234160 A1  Jul. 29, 2021

(30) Foreign Application Priority Data
Sep. 7, 2018 (KR) .................. 10-2018-0107294

(51) Int. Cl.
*H01M 4/505* (2010.01)
*H01M 4/04* (2006.01)
(Continued)

(52) U.S. Cl.
CPC ......... *H01M 4/382* (2013.01); *H01M 4/0404* (2013.01); *H01M 4/364* (2013.01);
(Continued)

(58) Field of Classification Search
CPC .... H01M 4/382; H01M 4/0404; H01M 4/364; H01M 4/505; H01M 4/525; H01M 10/0525; H01M 2004/028
See application file for complete search history.

(56) References Cited

U.S. PATENT DOCUMENTS

| 2003/0054252 A1 | 3/2003 | Kusumoto et al. |
| 2010/0003601 A1 | 1/2010 | Niessen et al. |

(Continued)

FOREIGN PATENT DOCUMENTS

| CN | 104518112 A | 4/2015 |
| CN | 107068964 A | 8/2017 |

(Continued)

OTHER PUBLICATIONS

International Search Report for Application No. PCT/KR2019/011573 mailed Dec. 20, 2019, 2 pages.

(Continued)

*Primary Examiner* — James Lee
(74) *Attorney, Agent, or Firm* — Lerner David LLP (57) ABSTRACT

The present disclosure provides a positive electrode for a secondary battery which includes a positive electrode active material and a lithium-based alloy. Also, the present disclosure provides a method of preparing the positive electrode for a secondary battery which includes the steps of forming a positive electrode material mixture layer including a positive electrode active material and forming a coating layer including a lithium-based alloy on the positive electrode material mixture layer, or forming a positive electrode material mixture layer by coating a positive electrode col- (Continued)

lector with a slurry for forming a positive electrode, which includes a positive electrode active material and a lithium-based alloy, and rolling the positive electrode collector.

8 Claims, 5 Drawing Sheets

(51) Int. Cl.
    *H01M 4/36*     (2006.01)
    *H01M 4/38*     (2006.01)
    *H01M 4/525*     (2010.01)
    *H01M 10/0525*     (2010.01)
    *H01M 4/02*     (2006.01)

(52) U.S. Cl.
    CPC .......... *H01M 4/505* (2013.01); *H01M 4/525* (2013.01); *H01M 10/0525* (2013.01); *H01M 2004/028* (2013.01)

(56) References Cited

U.S. PATENT DOCUMENTS

| | | |
|---|---|---|
| 2010/0035128 A1 | 2/2010 | Scordilis-Kelley et al. |
| 2014/0315104 A1 | 10/2014 | Liu et al. |
| 2014/0342224 A1 | 11/2014 | Cojocaru et al. |
| 2015/0010827 A1 | 1/2015 | Kim et al. |
| 2018/0261832 A1 | 9/2018 | Nho et al. |
| 2019/0260091 A1* | 8/2019 | Rho .................. H01M 4/0404 |
| 2020/0274152 A1 | 8/2020 | Nho et al. |

FOREIGN PATENT DOCUMENTS

| | | |
|---|---|---|
| CN | 108140820 A | 6/2018 |
| JP | H10189037 A | 7/1998 |
| JP | 2001236955 A | 8/2001 |
| JP | 2004335232 A | 11/2004 |
| JP | 2014531707 A | 11/2014 |
| JP | 6060177 B2 | 1/2017 |
| JP | 2017195028 A | 10/2017 |
| KR | 20070018293 A | 2/2007 |
| KR | 20080024597 A | 3/2008 |
| KR | 20110052594 A | 5/2011 |
| KR | 20150004648 A | 1/2015 |
| KR | 20150042730 A | 4/2015 |
| KR | 20160039786 A | 4/2016 |
| KR | 20160083818 A | 7/2016 |
| WO | 2014017752 A1 | 1/2014 |

OTHER PUBLICATIONS

Extended European Search Report including Written Opinion for Application No. 19856551.7 dated May 6, 2021, 8 pages.

\* cited by examiner

POSITIVE ELECTRODE FOR SECONDARY BATTERY, METHOD OF PREPARING THE SAME, AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2019/011573 filed Sep. 6, 2019, which claims the benefit of Korean Patent Application No. 10-2018-0107294, filed on Sep. 7, 2018, in the Korean Intellectual Property Office, the disclosures of which are incorporated herein in their entirety by reference.

TECHNICAL FIELD

The present disclosure generally relates to a positive electrode for a secondary battery, a method of preparing the same, and a lithium secondary battery including the positive electrode.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving performance of the lithium secondary battery have been actively conducted.

The lithium secondary battery denotes a battery in which a positive electrode including a positive electrode active material capable of intercalating/deintercalating lithium ions, a negative electrode including a negative electrode active material capable of intercalating/deintercalating lithium ions, and an electrolyte containing lithium ions, which is included in an electrode assembly having a microporous separator disposed between the positive electrode and the negative electrode, are included.

A lithium transition metal oxide is used as positive electrode active material of a lithium secondary battery, and a lithium metal, a lithium alloy, a metalloid such as silicon (Si) and tin (Sn), crystalline or amorphous carbon, or a carbon composite is used as a negative electrode active material. An electrode collector may be coated with the active material of appropriate thickness and length or the active material itself may be coated in the form of a film, and the resultant product is then wound or stacked with an insulating separator to prepare an electrode assembly. Thereafter, the electrode assembly is put into a can or a container similar thereto, and a secondary battery is then prepared by injecting an electrolyte solution.

A portion of lithium ions provided from the positive electrode of the lithium secondary battery is consumed to form a passivation layer called a solid electrolyte interface (SEI) by being reacted with the electrolyte on a surface of the negative electrode. That is, a problem occurs in which the lithium ions are consumed and reversible capacity is reduced during the formation of the SEI. Thus, it is necessary to compensate for the lithium ions consumed to form the SEI of the negative electrode in order to take full advantage of the positive electrode active material. Accordingly, a significant amount of research into the development of an irreversible additive, which may compensate for capacity limitations due to the SEI formation, has been conducted in order to develop a high capacity lithium secondary battery. However, most of conventional irreversible additives have a negative effect on the performance of the lithium secondary battery due to the occurrence of reversible charge and discharge in an operating voltage range. Therefore, there is still a need for the development of a lithium ion supply material as an irreversible additive which does not contribute to the reversible charge/discharge in the operating voltage range.

Technical Problem

An aspect of the present disclosure provides a positive electrode for a secondary battery including a new irreversible additive, which provides lithium ions in an initial charging process and does not contribute to subsequent charge/discharge, and a lithium secondary battery including the same.

Technical Solution

According to an aspect of the present disclosure, there is provided a positive electrode for a secondary battery which includes a positive electrode active material and a lithium-based alloy.

According to another aspect of the present disclosure, there is provided a lithium secondary battery including a positive electrode, a negative electrode, and a separator disposed between the positive electrode and the negative electrode, wherein the positive electrode is the positive electrode for a secondary battery of the present disclosure.

According to another aspect of the present disclosure, there is provided a method of preparing a positive electrode active material for a secondary battery which includes: forming a positive electrode material mixture layer including a positive electrode active material, and forming a coating layer including a lithium-based alloy on the positive electrode material mixture layer; or forming a positive electrode material mixture layer by coating a positive electrode collector with a slurry for forming a positive electrode, which includes a positive electrode active material and a lithium-based alloy, and rolling the positive electrode collector.

Advantageous Effects

According to the present disclosure, capacity limitations due to the formation of an SEI (solid electrolyte interface) may be effectively compensated and a high-capacity lithium secondary battery may be achieved by providing a positive electrode for a secondary battery including a new irreversible additive which provides lithium ions in an initial charging process and does not contribute to subsequent charge/discharge.

DETAILED DESCRIPTION OF THE PRESENT DISCLOSURE

Hereinafter, the present disclosure will be described in more detail to allow for a clearer understanding of the present disclosure. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical ideas set forth in the present disclosure, based on the principle that an inventor may properly define the meaning of the words or terms to best explain the present disclosure.

<Positive Electrode for Secondary Battery>

A positive electrode for a secondary battery of the present disclosure includes a positive electrode active material and a lithium-based alloy.

As the positive electrode active material, a lithium transition metal oxide typically used as a positive electrode active material may be used without limitation, and a lithium transition metal oxide including at least one transition metal cation selected from the group consisting of cobalt (Co), nickel (Ni), and manganese (Mn) may be more preferably used. For example, the positive electrode active material may include a layered compound such as lithium cobalt oxide ($LiCoO_2$) or lithium nickel oxide ($LiNiO_2$), lithium manganese oxides such as $Li_{1+n}Mn_{2-n}O_4$ (where n is 0 to 0.33), $LiMnO_3$, $LiMn_2O_3$, and $LiMnO_2$, Ni-site type lithium nickel oxide represented by the chemical formula $LiNi_{1-m}M^a{}_mO_2$ (where $M^a$=Co, Mn, aluminum (Al), copper (Cu), iron (Fe), magnesium (Mg), boron (B), or gallium (Ga), and m=0.01 to 0.3), lithium manganese composite oxide represented by the chemical formula $LiMn_{2-z}M^b{}_zO_2$ (where $M^b$=Co, Ni, Fe, chromium (Cr), zinc (Zn), or tantalum (Ta), and z=0.01 to 0.1) or $Li_2Mn_3M^cO_8$ (where $M^c$=Fe, Co, Ni, Cu, or Zn), spinel-structured lithium manganese composite oxide represented by $LiNi_rMn_{2-r}O_4$ (where r=0.01 to 1), and a lithium iron phosphate compound ($LiFePO_4$), but the positive electrode active material is not limited thereto. Also, a lithium composite transition metal oxide represented by the following Formula 1 may be included as the positive electrode active material.

[Formula 1]

In Formula 1, Q is at least one element selected from the group consisting of aluminum (Al), zirconium (Zr), titanium (Ti), magnesium (Mg), tantalum (Ta), niobium (Nb), molybdenum (Mo), and chromium (Cr), and $0.9 \leq a \leq 1.5$, $0 \leq b \leq 0.5$, $0 \leq c \leq 0.5$, $0 \leq d \leq 0.1$, and $-0.1 \leq \delta \leq 1.0$.

The lithium-based alloy denotes an alloy composed of a lithium metal and at least one other metal, and includes a lithium ion additive as an irreversible additive.

Figure 1:
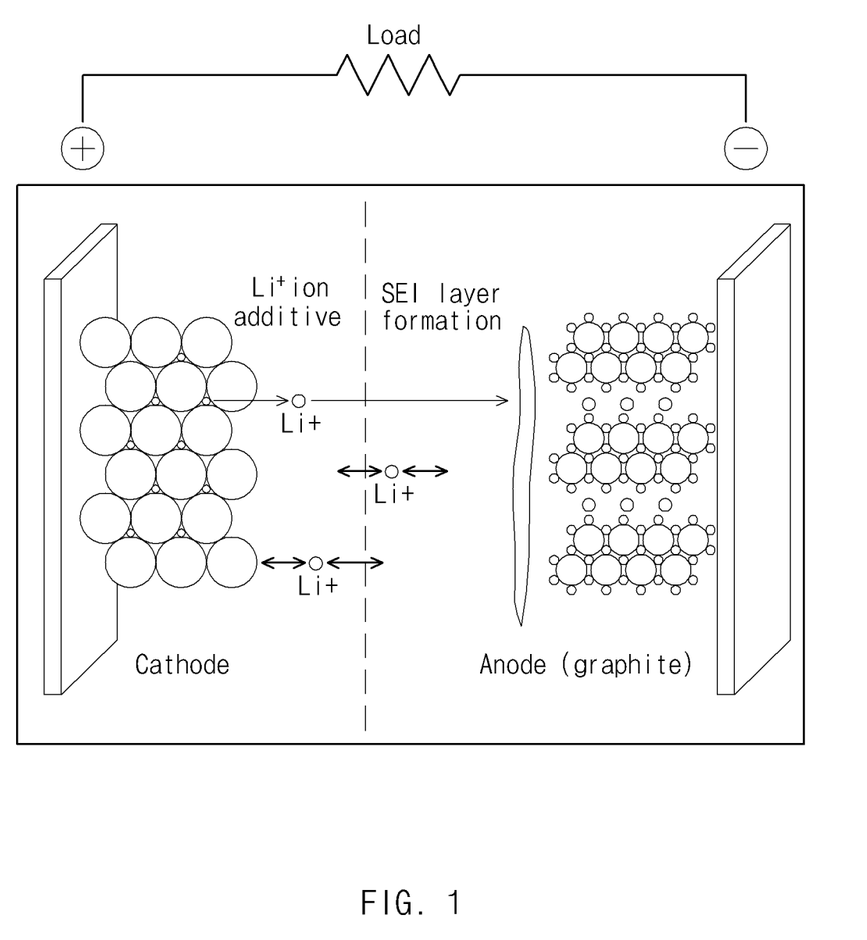
FIG. 1 is a schematic view of a lithium secondary battery using a lithium ion additive according to an embodiment of the present disclosure.

FIG. 1 is a schematic view of a lithium secondary battery using a lithium ion additive according to an embodiment of the present disclosure. Referring to FIG. 1, lithium ions supplied from the lithium ion additive, which is included in a positive electrode, are consumed to form a solid electrolyte interface (SEI) on a surface of a negative electrode, and lithium ions supplied from a positive electrode active material contribute to charge and discharge.

In the present disclosure, since the lithium-based alloy is added as the lithium ion additive, the lithium ions consumed to form the SEI on the surface of the negative electrode may be additionally supplied to prevent the consumption of the lithium ions of the positive electrode active material for the formation of the SEI and increase reversible capacity by maximum use of the positive electrode active material.

Also, the lithium-based alloy of the present disclosure may increase capacity even by adding a small amount thereof due to high capacity characteristics of the material itself. Furthermore, since the lithium-based alloy of the present disclosure provides lithium ions in an initial charging process and does not subsequently contribute to reversible charge/discharge in an operating voltage range of the lithium secondary battery, it may not adversely affect performance of the lithium secondary battery.

Any lithium-based alloy capable of compensating for the irreversible capacity may be used as the lithium-based alloy without limitation, but the lithium-based alloy may more preferably include at least one selected from the group consisting of a Li—Al-based alloy, a Li—Si-based alloy, a Li—Sn-based alloy, a Li—Bi-based alloy, and a Li—Sb-based alloy. For example, the Li—Al-based alloy may be $Li_9Al_4$ or $Li_3Al_2$, the Li—Si-based alloy may be $Li_{21}Si_5$, the Li—Sn-based alloy may be $Li_{17}Sn_{14}$, and the Li—Bi-based alloy may be $Li_3Bi$. More preferably, the Li—Al-based alloy may be used as the lithium-based alloy. In a case in which the Li—Al-based alloy is used, it is advantageous in that high capacity may be achieved even by adding a small amount thereof, because lithium (Li) may be mixed to an amount of 80 at % to have high-capacity characteristics, and energy density may be increased and costs may be reduced, because aluminum (Al) is relatively light and inexpensive. The Li—Al-based alloy may contain 30 at % to 80 at % of lithium (Li) and 20 at % to 70 at % of aluminum (Al), preferably 50 at % to 70 at % of lithium (Li) and 30 at % to 50 at % of aluminum (Al), and more preferably 50 at % to 60 at % of lithium (Li) and 40 at % to 50 at % of aluminum (Al).

The positive electrode active material and the lithium-based alloy may be included in a weight ratio of 99:1 to 1:99. The positive electrode active material and the lithium-based alloy may preferably be included in a weight ratio of 95:5 to 50:50 and may more preferably be included in a weight ratio of 90:10 to 80:20. Since a proper amount of lithium ions consumed to form the SEI may be additionally supplied from the lithium ion additive by including the lithium-based alloy within the above weight ratio range, a decrease in battery performance may be prevented while the reversible capacity may be increased.

The positive electrode for a secondary battery according to an embodiment of the present disclosure may include a positive electrode material mixture layer including the positive electrode active material; and a coating layer which is formed on a surface of the positive electrode material mixture layer and includes the lithium-based alloy. That is, the positive electrode active material of the lithium transition metal oxide and the lithium-based alloy, as the irreversible additive, may be included in different layers. Thus, in a case in which the positive electrode active material of the lithium transition metal oxide is included in the positive electrode material mixture layer and the coating layer including the lithium-based alloy is separately formed on the positive electrode material mixture layer, since a decrease in capacity caused by the reaction of the lithium-based alloy with a solvent and a binder in a positive electrode formation process may be prevented, it may be more effective to achieve high capacity.

Also, the positive electrode for a secondary battery according to another embodiment of the present disclosure may include a positive electrode material mixture layer in which the positive electrode active material and the lithium-based alloy are mixed. That is, the positive electrode active material of the lithium transition metal oxide and the lithium-based alloy, as the irreversible additive, may be included together in the same layer.

The positive electrode material mixture layer may be formed on a positive electrode collector, and the positive electrode material mixture layer may further include a conductive agent and a binder in addition to the above positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve adhesion of the positive electrode active material. The positive electrode collector, for example, may be used in various shapes such as that of a film, a sheet, a foil, a net, a porous body, a foam body, a non-woven fabric body, and the like.

The positive electrode active material may be included in an amount of 80 wt % to 98 wt %, preferably 85 wt % to 98 wt %, and more preferably 90 wt % to 95 wt % based on a total weight of the positive electrode material mixture layer.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be included in an amount of 1 wt % to 30 wt % based on the total weight of the positive electrode material mixture layer.

The binder improves adhesion between positive electrode active material particles and adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer rubber (EPDM rubber), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode material mixture layer.

<Method of Preparing Positive Electrode for Secondary Battery>

A method of preparing the above-described positive electrode for a lithium secondary battery of the present disclosure will be described.

The method of preparing the positive electrode for a secondary battery of the present disclosure: includes the steps of: forming a positive electrode material mixture layer including a positive electrode active material, and forming a coating layer including a lithium-based alloy on the positive electrode material mixture layer; or forming a positive electrode material mixture layer by coating a positive electrode collector with a slurry for forming a positive electrode, which includes a positive electrode active material and a lithium-based alloy, and rolling the positive electrode collector.

Figure 2:
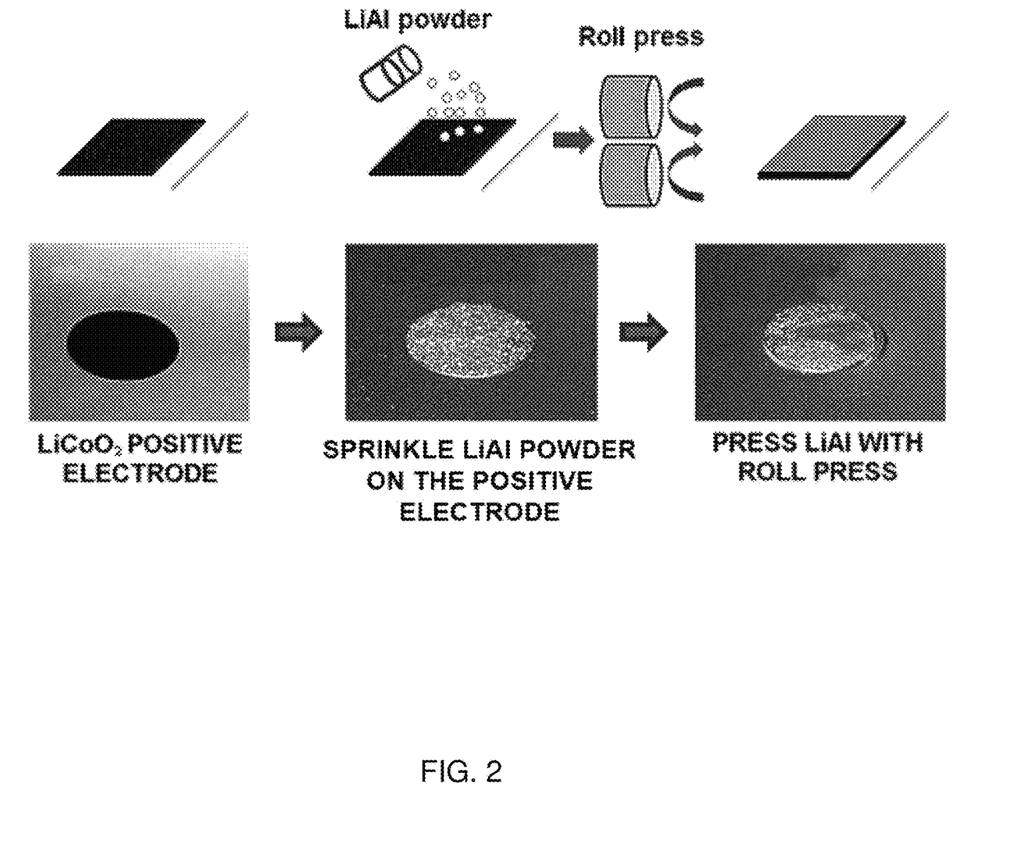
FIG. 2 schematically illustrates a preparation method for forming a lithium-based alloy coating layer according to an embodiment of the present disclosure.

FIG. 2 schematically illustrates a preparation method for forming a lithium-based alloy coating layer according to an embodiment of the present disclosure.

As illustrated in FIG. 2, in the preparation method for forming the positive electrode material mixture layer including the positive electrode active material and forming the coating layer including the lithium-based alloy on the positive electrode material mixture layer according to the embodiment of the present disclosure, the coating layer may specifically be formed by coating lithium-based alloy powder on the positive electrode material mixture layer including the positive electrode active material and rolling the positive electrode material mixture layer coated with the lithium-based alloy powder. As described above, a conventional positive electrode preparation process may be used to form the lithium-based alloy coating layer on the positive electrode material mixture layer.

In this case, in the forming of the positive electrode material mixture layer, a slurry for forming a positive electrode, which further includes a positive electrode active material, a conductive agent, a binder, and a solvent, may be first prepared. Types and amounts of the positive electrode active material, the conductive agent, and the binder are the same as those previously described in the positive electrode for a secondary battery. The solvent for forming the slurry for forming a positive electrode may be a solvent commonly used in the art and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse positive electrode active material, the conductive agent, and the binder in consideration of a coating thickness of the slurry and manufacturing yield, and may allow to have a viscosity that may provide excellent thickness uniformity during the subsequent coating for the preparation of the positive electrode. Next, a positive electrode collector is coated with the slurry for forming a positive electrode, and then dried and rolled to prepare a positive electrode material mixture layer. In this case, a positive electrode may be prepared by primary rolling during the formation of the positive electrode material mixture layer and secondary rolling after coating lithium-based alloy powder, or the primary rolling process is omitted during the formation of the positive electrode material mixture layer, and a positive electrode may be prepared by coating lithium-based alloy on the positive electrode material mixture layer and then rolling together.

As another method, the positive electrode material mixture layer may be prepared by casting the slurry for forming a positive electrode on a separate support and then laminating a film separated from the support on the positive electrode collector.

In the preparation method for forming the positive electrode material mixture layer by coating the positive electrode collector with the slurry for forming a positive electrode, which includes the positive electrode active material and the lithium-based alloy, and rolling the positive electrode collector according to another embodiment of the present disclosure, the slurry for forming a positive electrode, which includes the positive electrode active material and the lithium-based alloy and further includes a conductive agent and a binder, may specifically be prepared. Types and amounts of the positive electrode active material, the conductive agent, and the binder are the same as those previously described. In this case, the slurry for forming a positive electrode, which includes the lithium-based alloy, may not include an organic solvent. In a case in which an organic solvent generally used in the preparation of a slurry for forming a positive electrode is used, a problem may occur in which initial capacity is not obtained by reaction of the lithium-based alloy with the organic solvent. Thus, more preferably, the slurry for forming a positive electrode, which includes the lithium-based alloy, may not include the organic solvent, and may be subjected to a dry mixing process. Next, a positive electrode collector is coated with the slurry for forming a positive electrode, and then dried and rolled to prepare a positive electrode material mixture layer. As another method, the positive electrode material mixture layer may be prepared by casting the slurry for forming a positive electrode on a separate support and then laminating a film separated from the support on the positive electrode collector.

In addition, a type and an amount ratio of the lithium-based alloy are the same as those previously described in the positive electrode for a secondary battery.

<Lithium Secondary Battery>

According to another embodiment of the present disclosure, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode material mixture layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode material mixture layer selectively includes a binder and a conductive agent in addition to the negative electrode active material. The negative electrode material mixture layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\alpha$ ($0<\alpha<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present disclosure may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present disclosure is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), carbonate (DEC), methylethyl carbonate (MEC), diethyl ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlC_{14}$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N, N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present disclosure stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present disclosure, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present disclosure will be described in detail in such a manner that it may easily be carried out by a person with ordinary skill in the art to which the present disclosure pertains. The present disclosure may, however, be embodied in many different forms and should not be construed as being limited to the examples set forth herein.

Example 1

$LiCoO_2$, carbon black, and a PVDF binder were mixed in an N-methylpyrrolidone solvent at a weight ratio of 95:2.5:2.5 to prepare a slurry for forming a positive electrode, and one surface of an aluminum current collector was coated with the slurry, dried at 130° C., and then rolled to prepare a positive electrode material mixture layer.

The positive electrode material mixture layer was coated with Li—Al alloy (Li 50 at %, Al 50 at %) powder such that a weight ratio of the positive electrode active material to the Li—Al alloy was 95:5 and then rolled to prepare a positive electrode on which a coating layer was formed.

Example 2

A positive electrode was prepared in the same manner as in Example 1 except that the weight ratio of the positive electrode active material to the Li—Al alloy was 90:10.

Example 3

$LiCoO_2$, carbon black, and a PTFE binder were introduced into a reactor, and Li—Al alloy (Li 50 at %, Al 50 at %) powder was added to the reactor such that a weight ratio of the positive electrode active material to the Li—Al alloy was 98:2 and dry-mixed without a solvent to prepare a slurry for forming a positive electrode. One surface of an aluminum current collector was coated with the slurry and rolled to form a positive electrode material mixture layer.

Comparative Example 1

$LiCoO_2$, carbon black, and a PVDF binder were mixed in an N-methylpyrrolidone solvent at a weight ratio of 95:2.5:2.5 to prepare a slurry for forming a positive electrode, and one surface of an aluminum current collector was coated with the slurry, dried at 130° C., and then rolled to prepare a positive electrode material mixture layer.

Experimental Example: Battery Capacity Evaluation

Each of the positive electrodes prepared in Examples 1 to 3 and Comparative Example 1 was used.

Also, lithium metal was used as a negative electrode.

Each lithium secondary battery was prepared by preparing an electrode assembly by disposing a porous polyethylene separator between the positive electrode and negative electrode prepared as described above, disposing the electrode assembly in a case, and then injecting an electrolyte solution into the case. In this case, the electrolyte solution was prepared by dissolving 1.0 M lithium hexafluorophosphate (LiPF$_6$) in an organic solvent composed of ethylene carbonate/dimethyl carbonate/ethylmethyl carbonate (mixing volume ratio of EC/DMC/EMC=3/4/3).

Each lithium secondary battery half coin cell prepared as described above was charged at 0.1 C to a voltage of 4.2 V in a constant current/constant voltage (CCCV) mode at 25° C., and discharged at a constant current of 0.1 C to a voltage of 2.5 V to conduct an initial charge and discharge test. The results thereof are presented in Table 1 and FIGS. 3 to 5 below.

TABLE 1

|  | Initial charge capacity (mAh/g) | Initial discharge capacity (mAh/g) | Initial efficiency (%) |
|---|---|---|---|
| Example 1 | 190 | 140 | 73.7 |
| Example 2 | 230 | 135 | 58.7 |
| Example 3 | 155 | 140 | 90.3 |
| Comparative Example 1 | 148 | 140 | 94.6 |

Figure 3:
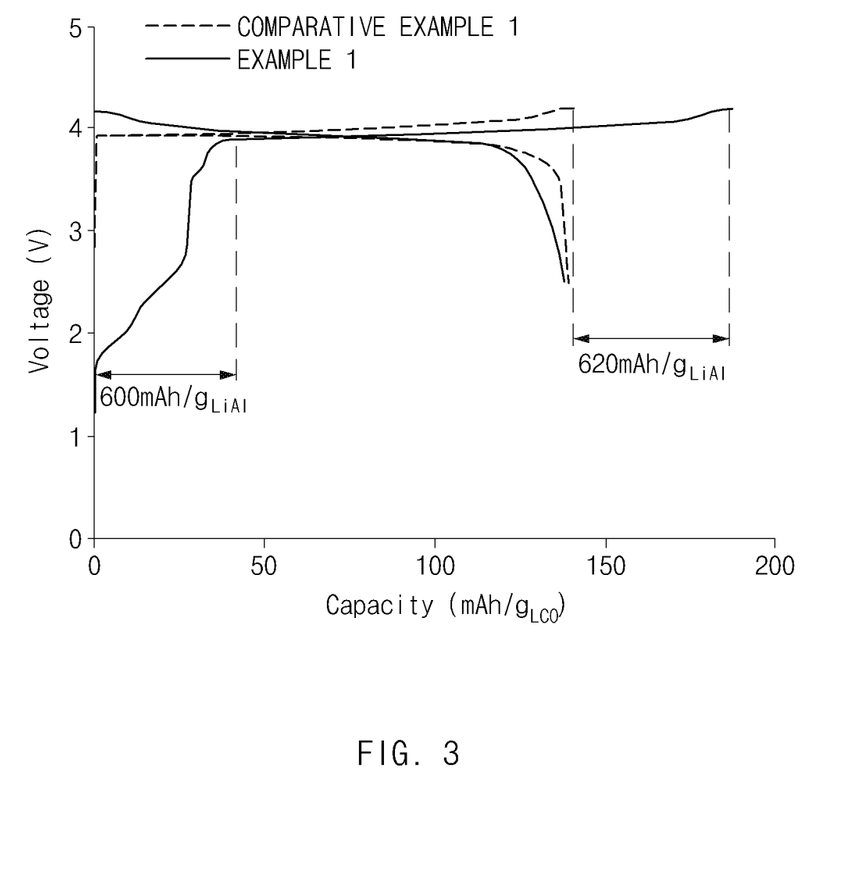
FIG. 3 is a graph illustrating capacities of lithium secondary battery cells respectively using positive electrodes according to Example 1 and Comparative Example 1.
Figure 4:
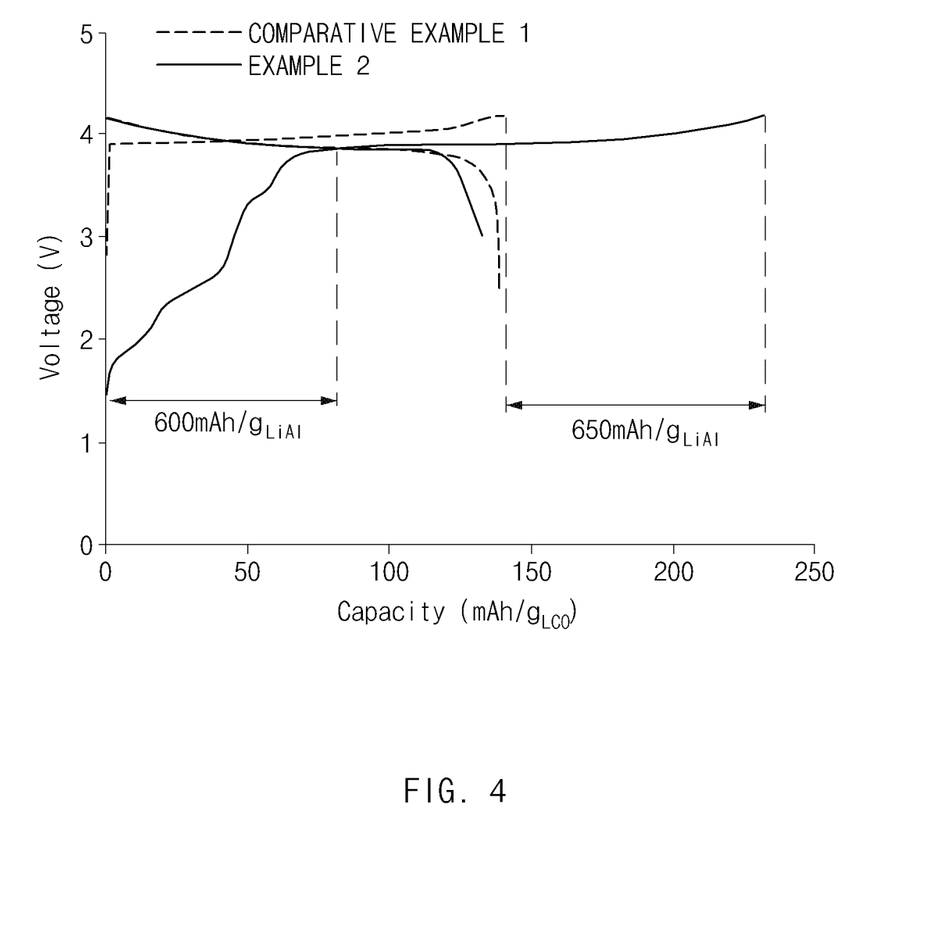
FIG. 4 is a graph illustrating capacities of lithium secondary battery cells respectively using positive electrodes according to Example 2 and Comparative Example 1.
Figure 5:
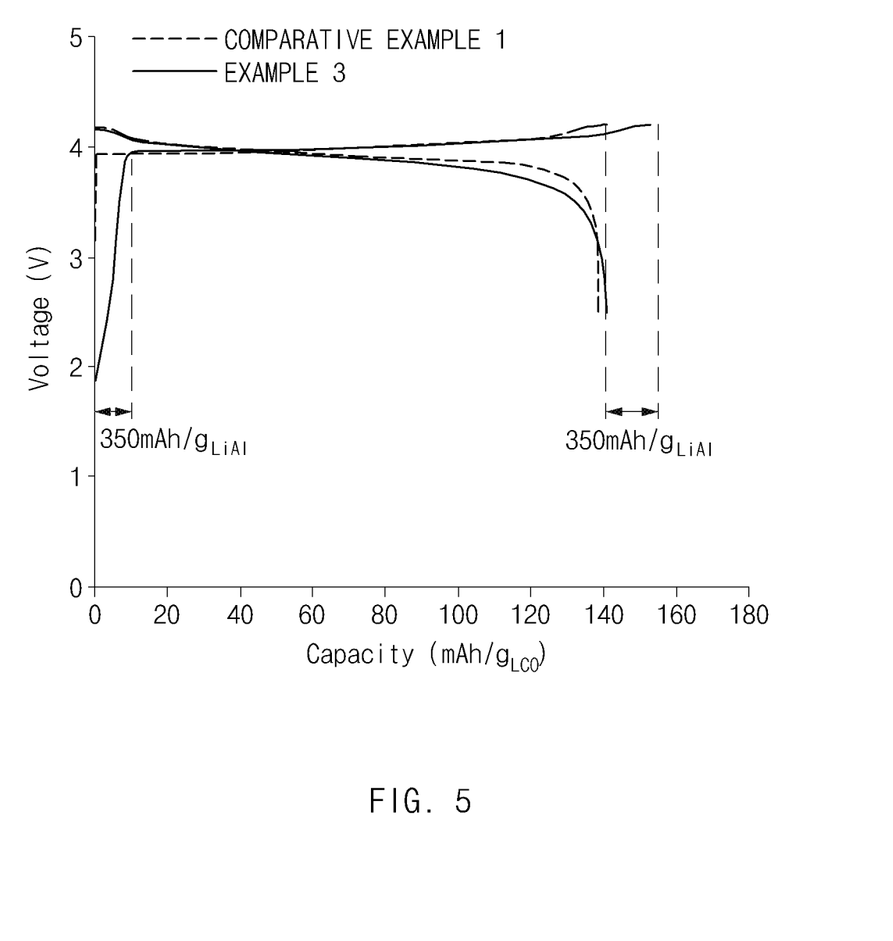
FIG. 5 is a graph illustrating capacities of lithium secondary battery cells respectively using positive electrodes according to Example 3 and Comparative Example 1.

Referring to Table 1 and FIGS. 3 to 5, with respect to Examples 1 to 3 in which the Li—Al-based alloy, as a lithium-based alloy, was used as an irreversible additive, it may be confirmed that initial charge capacities were significantly increased and initial efficiencies were reduced in comparison to those of Comparative Example 1 in which the lithium-based alloy was not added. From this, it may be understood that, with respect to Examples 1 to 3, the lithium-based alloy effectively acted as the irreversible additive.

The invention claimed is:

1. A positive electrode for a secondary battery, the positive electrode comprising a positive electrode active material and a lithium-based alloy, and a positive electrode material mixture layer in which the positive electrode active material and the lithium-based alloy are mixed,
   wherein the positive electrode active material is a lithium transition metal oxide including at least one transition metal cation selected from the group consisting of cobalt (Co), nickel (Ni), and manganese (Mn), and
   wherein the lithium-based alloy comprises at least one selected from the group consisting of a Li—Al-based alloy, a Li—Si-based alloy, a Li—Sn-based alloy, a Li—Bi-based alloy, and a Li—Sb-based alloy.

2. The positive electrode for a secondary battery of claim 1, wherein the lithium-based alloy is a Li—Al-based alloy.

3. The positive electrode for a secondary battery of claim 2, wherein the Li—Al-based alloy contains 30 at % to 80 at % of lithium and 20 at % to 70 at % of aluminum.

4. The positive electrode for a secondary battery of claim 1, wherein the positive electrode active material and the lithium-based alloy are included in a weight ratio of 99:1 to 1:99.

5. A lithium secondary battery comprising a positive electrode, a negative electrode, and a separator disposed between the positive electrode and the negative electrode, wherein the positive electrode is the positive electrode for a secondary battery of claim 1.

6. A method of preparing a positive electrode for a secondary battery, the method comprising: forming a positive electrode material mixture layer by coating a positive electrode collector with a slurry for forming a positive electrode, which includes a mixture of a positive electrode active material and a lithium-based alloy, and rolling the positive electrode collector, wherein the positive electrode active material is a lithium transition metal oxide including at least one transition metal cation selected from the group consisting of cobalt (Co), nickel (Ni), and manganese (Mn), and wherein the lithium-based alloy comprises at least one selected from the group consisting of a Li—Al-based alloy, a Li—Si-based alloy, a Li—Sn-based alloy, a Li—Bi-based alloy, and a Li—Sb-based alloy.

7. The method of claim 6, wherein, in the forming of the positive electrode material mixture layer by coating the positive electrode collector with the slurry for forming a positive electrode, which includes the positive electrode active material and the lithium-based alloy, and rolling the positive electrode collector, the slurry for forming a positive electrode does not comprise an organic solvent.

8. The method of claim 6, wherein the positive electrode active material and the lithium-based alloy are included in a weight ratio of 99:1 to 1:99.

* * * * *